J. AIZENMAN.
GUARD FOR DRIVERS' SEATS OF VEHICLES.
APPLICATION FILED JULY 20, 1917.
1,273,800.
Patented July 30, 1918.
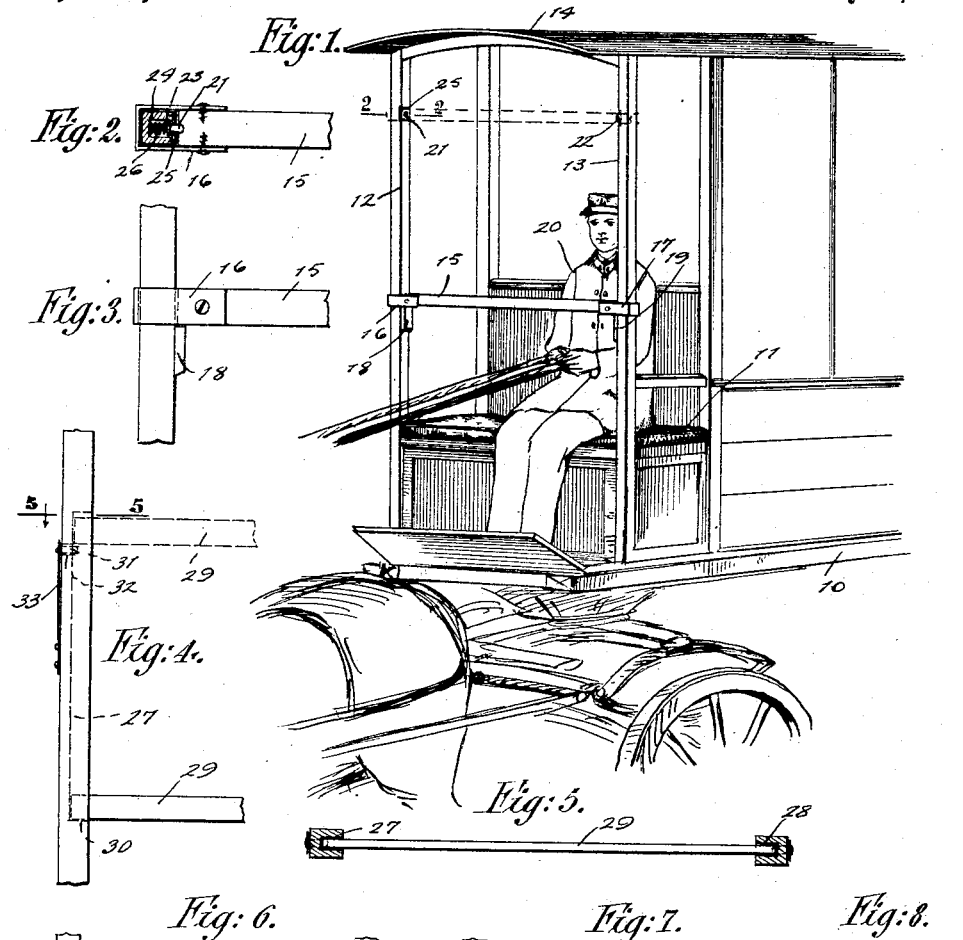
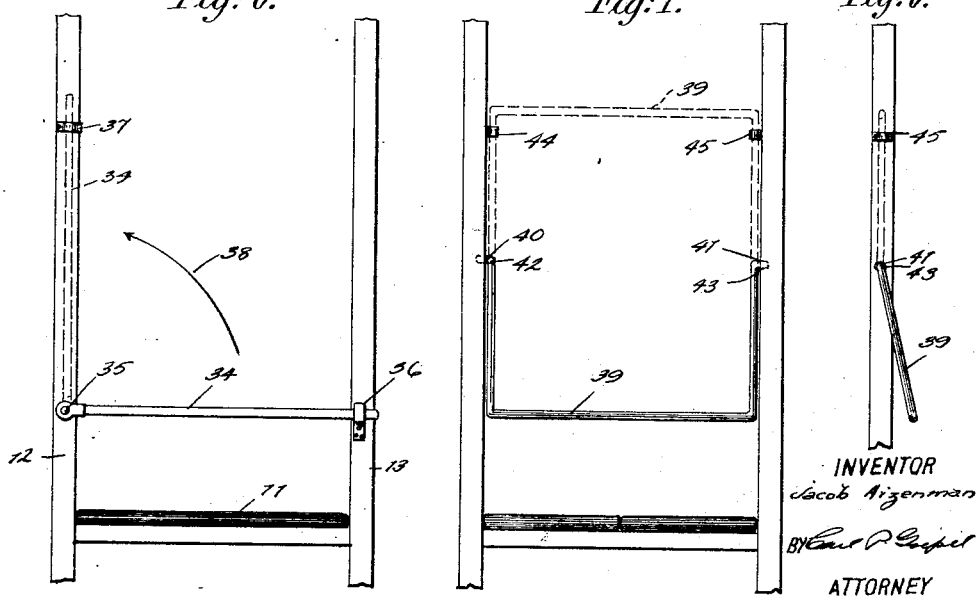
INVENTOR
Jacob Aizenman
ATTORNEY

UNITED STATES PATENT OFFICE.

JACOB AIZENMAN, OF BROOKLYN, NEW YORK.

GUARD FOR DRIVERS' SEATS OF VEHICLES.

1,273,800.  Specification of Letters Patent.  Patented July 30, 1918.

Application filed July 20, 1917. Serial No. 181,729.

*To all whom it may concern:*

Be it known that I, JACOB AIZENMAN, a citizen of the United States, and resident of the borough of Brooklyn, in the county of Kings and State of New York, have invented certain new and useful Improvements in Guards for Drivers' Seats of Vehicles, of which the following is a specification.

The present invention relates to improvements in guards for drivers' seats of vehicles, and particularly such vehicles as horse drawn trucks, motor trucks, vans, and the like, where the driver is at a considerable elevation, and the vehicle is unprotected, or open at the front. Many accidents have been occasioned when these vehicles have been struck from behind by a street car, or other vehicle, or stopped suddenly, the driver in most cases being thrown forwardly in front of the vehicle, and drivers have sometimes been killed in this way. It is an object of the present invention, therefore, to provide a seat guard, which will protect and prevent the driver from falling forwardly, and which will at the same time not interfere with his manipulation of the vehicle.

Another object is to provide such a guard which may be conveniently and quickly swung or moved out of the way of the driver when desired, as for instance, when he alights from or enters the vehicle. A still further object is to provide such improvements which will be simple and inexpensive in construction, and which may be readily adapted to the types of vehicles now in use.

With these and other objects in view, embodiments of my invention are shown in the accompanying drawings, and these embodiments will be hereinafter more fully described with reference thereto, and the invention will be finally pointed out in the claim.

In the accompanying drawings:

Figure 1 is a perspective view of a vehicle embodying one form of my improved device;

Fig. 2 is a section on the line 2—2 of Fig. 1;

Fig. 3 is a front view, enlarged, of a portion of the side post and guard rail;

Fig. 4 is a front view, with parts broken away of a modified form of construction;

Fig. 5 is a sectional plan view thereof;

Fig. 6 is a front view of a further modified form; and

Figs. 7 and 8 are front and side views respectively of still another modification.

Similar reference characters indicate corresponding parts throughout the several figures of the drawings.

Referring to the drawings, and more particularly to Fig. 1 thereof, the vehicle 10 is provided with a seat 11, exposed at the front, and having side posts 12 and 13 extending upwardly therefrom and supporting the canopy 14 of the top. This type of vehicle is merely shown as convenient to illustrate my improvements, but it will be understood that the invention may be embodied in other types of vehicles.

The embodiment of my invention shown in Figs. 1 to 3, consists of a transverse rail 15 disposed between the posts 12 and 13, and provided at its ends with U-shaped members 16 and 17, which embrace the posts, thereby supporting the rail and permitting of its movement upwardly and downwardly along the posts. In the lower position the guard rail rests upon stops 18 and 19, provided on the inner sides of the posts, in front of the driver, indicated at 20, so that he is effectively protected against being thrown from the seat. When the rail is not in use it is raised along the posts, and is retained in its upper position, indicated in dotted lines (Fig. 1), by means of a pair of spring stops 21 and 22 respectively provided in the posts, in opposed relation, and which are pressed into their sockets by engagement of the bar therewith during its upward movement, the stops resuming their normal position when the bar is raised above them. The stops are released in a similar manner by pulling downwardly upon the bar. These stops are provided with a shoulder 23 and are held in a socket 24 of the posts by a plate 25, a spring 26 in the socket resiliently holding the stop in projected position. The projecting portion of the stops is rounded so that the rail may be easily forced across the same. In the raised position of the rail, it will be seen the same is entirely out of the way, providing a free way for the driver to enter and leave the seat.

In Figs. 4 and 5, I have illustrated a slightly modified form of construction. In this form the posts are provided respectively with longitudinal slots 27 and 28, in which are slidably engaged the ends of a guard rail 29, the base portion 30 of the slots forming a lower rest for the rail. The rail is supported in raised position by a spring stop 31, projecting through an opening 32 in the post and mounted on the end of a leaf spring 33.

In Fig. 6, I have shown a further modified form in which the guard rail is in the form of a bar 34, pivoted to one post at 35, and adapted to be swung transversely across posts and have its free end rest in a bracket 36. When not in use, the bar is swung into vertical position, and is caught by a spring holder 37, provided on the post. The arrow 38 indicates the direction of movement of the bar.

In the still further modified form of construction, shown in Figs. 7 and 8, the guard consists of a U-shaped bar 39, having its extremities 40 and 41 bent into sockets 42 and 43 in the posts. The protective position of the bar is shown in full lines, while the dotted lines indicate the raised position, spring members 44 and 45 being provided to retain the bar in the raised position.

With my improvements, a simple and at the same time efficient protection is provided for drivers of vehicles, and any danger of the driver being thrown from the vehicle and being killed, is entirely obviated. When not in use the same is inconspicuous and entirely out of the way. The device in no way interferes with the manipulation of the vehicle.

I have illustrated and described preferred and satisfactory embodiments of my invention, but it is obvious that changes may be made therein within the spirit and scope thereof, as defined in the appended claim.

I claim:

The combination with a driver's seat of a vehicle, having upright side posts, a guard rail extending between said posts, means on said guard rail slidably engaging said posts, means on said posts adapted to support said guard rail in front of said seat, and spring stops on said respective posts adapted to automatically retain said rail at an elevated position away from in front of said seat upon movement of said rail above said spring stops, said rail adapted to press said stops into non-projecting position into said posts by being moved across said stops.

In testimony, that I claim the foregoing as my invention, I have signed my name.

JACOB AIZENMAN.

Copies of this patent may be obtained for five cents each, by addressing the "Commissioner of Patents, Washington, D. C."